(12) United States Patent
Philipse

(10) Patent No.: US 11,148,893 B2
(45) Date of Patent: Oct. 19, 2021

(54) ROLL HOLDER ASSEMBLY FOR LOADING MEDIA ROLLS IN WIDE FORMAT PRINTERS

(71) Applicant: Océ Holding B.V., Venlo (NL)

(72) Inventor: Hermanus J. P. M. Philipse, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 292 days.

(21) Appl. No.: 16/519,948

(22) Filed: Jul. 23, 2019

(65) Prior Publication Data

US 2020/0062524 A1   Feb. 27, 2020

(30) Foreign Application Priority Data

Aug. 21, 2018   (EP) .................................... 18189963

(51) Int. Cl.
*B65H 16/10* (2006.01)
*B65H 16/06* (2006.01)
(Continued)

(52) U.S. Cl.
CPC .......... *B65H 16/106* (2013.01); *B41J 15/042* (2013.01); *B65H 16/02* (2013.01);
(Continued)

(58) Field of Classification Search
CPC ...... B65H 16/00; B65H 16/02; B65H 16/028; B65H 16/04; B65H 16/06; B65H 16/08;
(Continued)

(56) References Cited

U.S. PATENT DOCUMENTS 5,709,481 A   1/1998  Hinojosa et al.
8,790,028 B2*  7/2014  Niihara ................. B41J 15/042
                                                 400/613
(Continued)

FOREIGN PATENT DOCUMENTS

| EP | 3 345 848 A1 | 7/2018 |
| EP | 3 345 849 A1 | 7/2018 |
| WO | WO 2017/012666 A1 | 1/2017 |

OTHER PUBLICATIONS

European Search Report of application 18 18 9963 dated Jan. 22, 2019.

*Primary Examiner* — Michael R Mansen
*Assistant Examiner* — Raveen J Dias
(74) *Attorney, Agent, or Firm* — Birch, Stewart, Kolasch & Birch, LLP

(57) ABSTRACT

A media roll holder assembly for a roll is detachably supported in a printing system. A rotational drive includes a roll engaging element configured for fittingly engaging and driving a drive engaging element of a roller, for example an Oldham coupling. A first guide surface is configured to support and direct the roller in a loading direction. A second guide surface at least partially extends at an angle with respect to the first guide surface, such that movement of the roller over the first guide surface brings the drive engaging element in contact with the second guide surface. The second guide surface directs the drive engaging element into a predetermined orientation, which orientation aligns the drive engaging element with the roll engaging element in a loading orientation, such that further movement of the roller in the loading direction inserts the drive engaging element into the roll engaging element.

17 Claims, 5 Drawing Sheets

(51) Int. Cl.
 *B65H 16/04* (2006.01)
 *B65H 16/02* (2006.01)
 *B41J 15/04* (2006.01)

(52) U.S. Cl.
 CPC ............. *B65H 16/04* (2013.01); *B65H 16/06* (2013.01); *B41J 15/04* (2013.01); *B65H 2301/413* (2013.01); *B65H 2301/4132* (2013.01); *B65H 2301/4136* (2013.01); *B65H 2301/41366* (2013.01); *B65H 2301/413223* (2013.01)

(58) Field of Classification Search
 CPC .... B65H 16/103; B65H 16/106; B65H 18/00; B65H 18/02; B65H 18/023; B65H 18/025; B65H 18/026; B65H 18/028; B65H 2301/4136; B65H 2301/41366; B65H 2301/41282; B65H 2301/413; B65H 2301/4132; B65H 2301/413223; B65H 2301/413246; B65H 2301/4135; B41J 11/00; B41J 11/58; B41J 13/00; B41J 15/00; B41J 15/02; B41J 15/04; B41J 15/042

See application file for complete search history.

(56) References Cited

U.S. PATENT DOCUMENTS

| | | | |
|---|---|---|---|
| 9,487,034 B2* | 11/2016 | Ozaki | B41J 15/02 |
| 2008/0011805 A1* | 1/2008 | Genta | B65H 19/126 226/51 |
| 2008/0277851 A1* | 11/2008 | Genta | B41J 15/042 269/56 |
| 2013/0271543 A1 | 10/2013 | Akatsu et al. | |
| 2013/0278696 A1* | 10/2013 | Akatsu | B41J 11/001 347/104 |
| 2014/0097288 A1* | 4/2014 | Yanase | B65H 19/126 242/564.5 |
| 2015/0103126 A1* | 4/2015 | Akatsu | B41J 11/04 347/104 |
| 2018/0118492 A1* | 5/2018 | Estella | B65H 16/06 |
| 2018/0186589 A1* | 7/2018 | Wind | B65H 16/08 |

* cited by examiner

ROLL HOLDER ASSEMBLY FOR LOADING MEDIA ROLLS IN WIDE FORMAT PRINTERS

FIELD OF THE INVENTION

The present invention generally pertains to a media roll holder assembly for a roll of print medium that is detachably supported in a printing system. The present invention further relates to a method for loading a roll into such a printing system.

BACKGROUND ART

Media roll holder assemblies are known from e.g. EP 3345849 A1 and EP 3345848 A1. Said media roll holder assemblies comprise a drive having a gear wheel which engages a corresponding gear wheel on an input roller holding the wound up print medium. Certain printing systems do not apply such gear wheel based drives, but not-gear based coupled drive mechanisms, such as Oldham couplings. Some of these drive mechanism require an additional aligning step wherein a drive engaging element has to be oriented in a predetermined orientation to allow it to be inserted into a receiving slot of a rotational drive. In wide format roll printing where a length of the input roller may exceed three meters, this additional aligning is cumbersome to perform, especially when a single operator has to perform the alignment at either end of the long roller Thereby productivity is reduced.

SUMMARY OF THE INVENTION

It is an object of the present invention to provide a media roll holding assembly which enables easy loading of input rollers for wide format print media comprising an Oldham-like coupling element.

In a first aspect of the present invention, a media roll holder assembly for a roll that is detachably supported in a printing system is provided. The media roll holder assembly comprises:
- a rotational drive comprising a roll engaging element configured for fittingly engaging and driving a drive engaging element of a roller;
- a first guide surface configured to support and direct the roller in a loading direction;
- a second guide surface at least partially extending at an angle with respect to the first guide surface, such that movement of the roller over the first guide surface brings the drive engaging element in contact with the second guide surface, wherein the second guide surface directs the drive engaging element into a predetermined orientation, which orientation aligns the drive engaging element with the roll engaging element in a loading orientation, such that further movement of the roller in the loading direction inserts the drive engaging element into the roll engaging element.

The first guide surface defines the loading direction along which the roller is moved for loading. The first guide surface supports the roller. The second guide surface is positioned so as not to block movement of the roller, but to contact the drive engaging element. The second guide surface is at least partially inclined with respect to the first guide surface, such that it contacts the drive engaging element regardless of the orientation of the drive engaging element. The operator hence need not be concerned with the orientation of the drive engaging element while loading, as moving the drive engaging element along the second guide surface orients the drive engaging element into the desired predetermined orientation. While in the predetermined orientation the drive engaging element is transferred from the second guide surface to the roll engaging element merely by moving the roller further in the transport direction. The drive engaging element and the roll engaging element comprise corresponding shapes and/or dimensions, such that these elements fit together. As such an easy to use media roll holder assembly for rollers with Oldham-like couplings is achieved.

Preferred embodiments are described further in the dependent claims.

In an embodiment, one of the roll engaging element and the drive engaging element is a receiving slot. The roll engaging element and drive engaging element form corresponding parts of a coupling which transfers the driving force from the rotational drive to the roller. Said parts are shaped to fittingly engage one another, for example a protrusion and a fittingly dimensioned recess. In a further embodiment, the other one of the roll engaging element and the drive engaging element is a longitudinal beam element dimensioned to fit in the receiving slot. Such a coupling is for example an Oldham coupling. An Oldham coupling is generally used to connect two parallel shafts whose axes are at a small distance apart. Two flanges, each having a rectangular slot, are keyed, one on each shaft. The two flanges are positioned such that, the slot in one is at a right angle to the slot in the other. To make the coupling, a circular disc with two rectangular projections on either side and at right angle to each other, is placed between the two flanges. During motion, the central disc, while turning, slides in the slots of the flanges. Power transmission takes place between the shafts, because of the positive connection between the flanges and the central disc, resulting in a robust coupling which overcomes relative positioning errors between the rotation axes of the drive and the roller.

In an embodiment, the second guide surface is configured to direct the drive engaging element into the predetermined orientation parallel to the loading direction. The drive engaging element preferably comprises a longitudinal body, such as a protrusion or slot on a lateral side of the roller. When oriented in the predetermined orientation the drive engaging element is preferably substantially straight or tapered in its longitudinal direction. This allows the drive engaging element to be engaged by the roll engaging element without obstructions.

In another embodiment, the first guide surface extends parallel to the loading direction. The first guide surface, which may be formed by a guide plate, determines the loading direction as well as the height position of the roller in the height direction (direction Z in the figures). The first guide surface is preferably straight.

In a further embodiment, the second guide surface comprises a first guide surface portion upstream of a second guide surface portion, wherein the first guide surface portion extends at a non-zero angle with respect to the first guide surface and wherein the second guide surface portion extends parallel to the first guide surface. When viewed along the loading direction the first guide surface portion is positioned in front of the second guide surface portion. The first guide surface portion comprises an inclined surface or plane with respect to the first guide surface. This ensures that the drive engaging element contacts the first guide surface portion regardless of its orientation. The downstream end of the first guide surface portion preferably transitions into the second guide surface portion which extends parallel to the first guide surface, which in turn is preferably parallel to the loading direction. While contact with the first guide surface portion rotates the drive engaging element, the second guide surface portion is positioned such that it prevents further rotation of the drive engaging element, ensuring that the drive engaging element remains in its predetermined orientation as it moves towards the roller engaging element.

In an embodiment, the media roll holder assembly according to the present invention further comprises a support positioned downstream of the second guide surface in the loading direction to support the roll in an operative position, such that the roll is arranged to rotate around a rotation axis, wherein the support is provided with a tapered positioning recess configured to receive at least part of the roller, such that the roller is aligned into a predetermined position. The support may be formed by an end portion of the first guide surface. The positioning recess defines an end position for the roller in the loading direction, such that by urging the roller against the positioning recess the roller is positioned in a predetermined operational position. In a preferred embodiment, the positioning recess is tapered in the loading direction. The tapering provides a narrowing channel such when the roll is pushed further into the channel, it is guided to a predetermined end position. Preferably, the positioning recess may be tapered or narrowing in the loading direction when viewed in a height direction perpendicular to the plane of the first guide surface. By moving the roller into the positioning recess, the tapering aligns the roller to a predetermined width position in a width direction perpendicular to both the loading direction and the height direction. As such, the positioning recess in combination with the first guide surface ensures that the roller is properly positioned in all directions by merely moving the roller in the loading direction. The tapered positioning recess may for example be formed by providing an opening in a plate of sufficient thickness, wherein the edges of the opening are slanted or inclined with respect to the plane of the plate.

In a further embodiment, the media roll holder assembly according to the present invention further comprises:
 a holding element positionable in a holding position at a periphery of the roller to engage the roller at a contact point for holding the roller rotatably around its rotation axis;
 a pivotable arm on which the holding element is provided, the pivotable arm being configured to pivot around a pivot axis, wherein the holding element in the holding position is positioned at an angle of at least 180° from the pivot axis as measured around the rotation axis in a first pivoting direction wherein the holding element moves towards the rotation axis.

The pivotable arm extends between the pivot axis and the holding element over at least a semi-circle. In consequence any lifting force on the roller, results in the holding element being effectively pressed onto the roller. The holding force of the holding element is derived from the lifting force, so in absence of a lifting force the holding element exerts substantially no force on the roll. Further, no urging devices are required to provide the holding force. In this manner the holding element only exerts a force on the roller when needed. Further, since the holding element only exerts a force on the roller when needed, friction from the holding element on the roll is reduced, allowing for a more accurate control of the step size of the web transport. This reduces print artifacts due to improperly overlapping swaths in the printed image.

In an embodiment, the pivotable arm is configured, such that a lifting force on the roller results in a holding force on the holding element in the holding position in a first angular direction, which holding force urges the pivotable arm in the first pivoting direction, thereby urging the holding element against the roll for clamping the roller.

This holding force then urges the pivotable arm in the first pivoting direction, thereby urging the holding element against the roller. The urging results in a clamping of the roller between the holding element and the support. Advantageously the holding force acts only when a lifting force is present. No excess forces are thus exerted on the roller when it is not required, ensuring a smooth and well-controlled rotation of the roller. Accurate control of the roller's rotation allows for higher print quality as the medium may be positioned very accurately.

In another embodiment, the pivotable arm is configured to pivot around the pivot axis, such that in a first pivoting direction the distance between the holding element and the rotation axis of the roller is decreased.

By appropriately positioning the pivot axis in the angular pivot axis range, the lifting force is redirected into a holding force which urging the holding element in a direction with a component opposite to the lifting force. For example, when the roller experiences an upwards lifting force, the assembly according to the present invention ensures that in reaction the holding element is urged downwards. Thereby, the roller is securely held in place without requiring additional holding forces to be present on the roller when such forces are not required. It will be appreciated that it is preferred that the first angular direction and the first pivoting direction are substantially similar, meaning that both imply a rotation in the roughly or substantially same angular direction around the rotation axis.

In an embodiment, the second guide surface is formed by a guide block positioned besides the first guide surface, such that movement of the roller over the first guide surface in the loading direction is not obstructed by the guide block. Basically, the guide block is positioned to the side of the path of roller in the width direction. The path of the roller is defined as the surface portion of the first guide surface contacted by the roller as it moves in the loading direction.

In a further aspect, the present invention provides a roll printing system comprising a media roll holder assembly according to any of the previous claims.

In another aspect, the present invention provides a method for loading a roller for wound up print media into a media roll holder assembly. The method comprises the steps of:
 moving the roller onto a first guide surface in a loading direction, such that the roller first moves along a second guide surface at least partially extending at an angle with respect to the first guide surface, wherein movement of the roller over the first guide surface brings a drive engaging element of the roller in contact with the second guide surface, such that the second guide surface directs the drive engaging element into a predetermined orientation;
 moving the roller further over the first guide surface, such that the drive engaging element in the predetermined orientation is transferred from the second guide surface to a roll engaging element of a rotational drive.

In an embodiment, the method according to the present invention further comprises the step of:
 moving the roller further in the loading direction, such that the roller is urged against a tapered positioning recess, thereby aligning the roller in a predetermined operational position.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematical drawings which are given by way of illustration only, and thus are not limitative of the present invention, and wherein.

DETAILED DESCRIPTION OF THE DRAWINGS

Figure 1A:
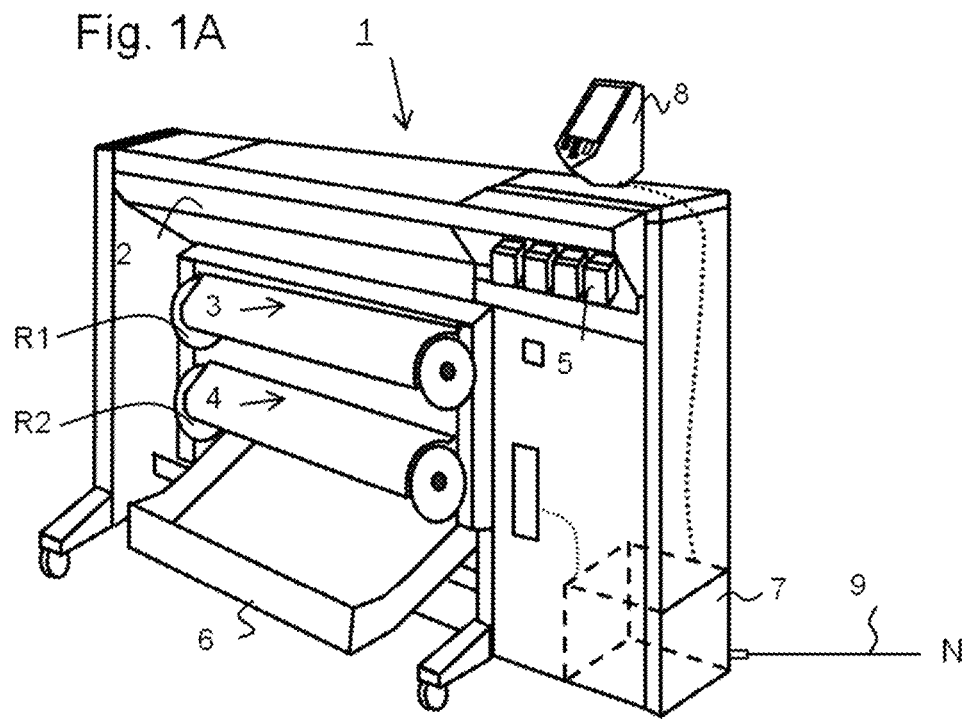
FIG. 1A is a schematic perspective view of a printing system according to the present invention.

The present invention will now be described with reference to the accompanying drawings, wherein the same reference numerals have been used to identify the same or similar elements throughout the several views.

Figure 1B:
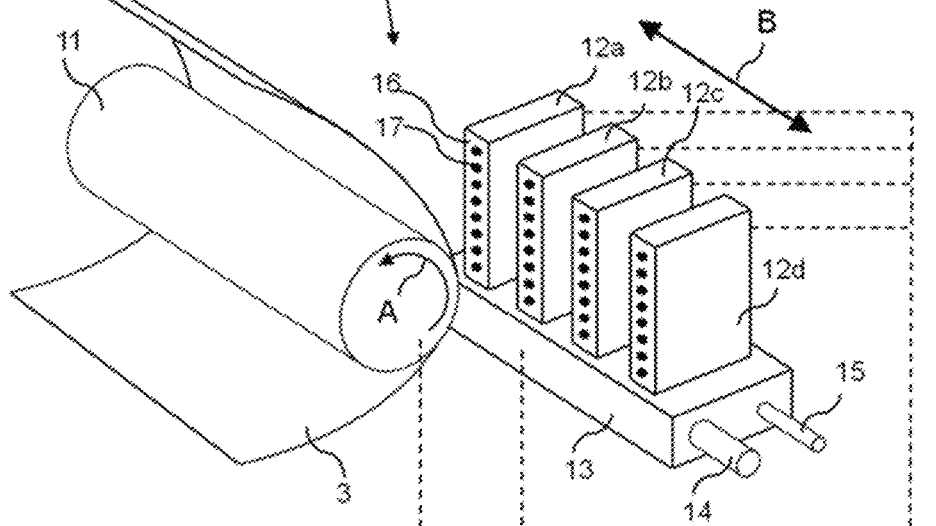
FIG. 1B is a schematic perspective view of an image forming unit of the printing system in FIG. 1A.

FIG. 1A shows an image forming apparatus 1, wherein printing is achieved using a wide format inkjet printer. The wide-format image forming apparatus 1 comprises a housing 2, wherein the printing assembly, for example the ink jet printing assembly shown in FIG. 1B is placed. The image forming apparatus 1 also comprises a storage means for storing image receiving member 3, 4, a delivery station to collect the image receiving member 3, 4 after printing and storage means 5 for marking material. In FIG. 1A, the delivery station is embodied as a delivery tray 6. Optionally, the delivery station may comprise processing means for processing the image receiving member 3, 4 after printing, e.g. a folder or a puncher. The wide-format image forming apparatus 1 furthermore comprises means for receiving print jobs and optionally means for manipulating print jobs. These means may include a user interface unit 8 and/or a control unit 7, for example a computer.

Images are printed on a image receiving member, for example paper, supplied by a roll 3, 4. The roll 3 is supported on the roll support R1, while the roll 4 is supported on the roll support R2. Alternatively, cut sheet image receiving members may be used instead of rolls 3, 4 of image receiving member. Printed sheets of the image receiving member, cut off from the roll 3, 4, are deposited in the delivery tray 6.

Each one of the marking materials for use in the printing assembly are stored in four containers 5 arranged in fluid connection with the respective print heads for supplying marking material to said print heads.

The local user interface unit 8 is integrated to the print engine and may comprise a display unit and a control panel. Alternatively, the control panel may be integrated in the display unit, for example in the form of a touch-screen control panel. The local user interface unit 8 is connected to a control unit 7 placed inside the printing apparatus 1. The control unit 7, for example a computer, comprises a processor adapted to issue commands to the print engine, for example for controlling the print process. The image forming apparatus 1 may optionally be connected to a network N. The connection to the network N is diagrammatically shown in the form of a cable 9, but nevertheless, the connection could be wireless. The image forming apparatus 1 may receive printing jobs via the network. Further, optionally, the controller of the printer may be provided with a USB port, so printing jobs may be sent to the printer via this USB port.

FIG. 1B shows an ink jet printing assembly 10. The ink jet printing assembly 10 comprises supporting means for supporting an image receiving member 3. The supporting means 11 are shown in FIG. 1B as a platen 11, but alternatively, the supporting means 11 may be a flat surface. The platen 11, as depicted in FIG. 1B, is a rotatable drum 11, which is rotatable about its axis as indicated by arrow A. The supporting means 11 may be optionally provided with suction holes for holding the image receiving member 3 in a fixed position with respect to the supporting means 11. The ink jet printing assembly 10 comprises print heads 12a-12d, mounted on a scanning print carriage 13. The scanning print carriage 13 is guided by suitable guiding means 14, 15 to move in reciprocation in the main scanning direction B. Each print head 12a-12d comprises an orifice surface 16, which orifice surface 16 is provided with at least one orifice 17. The print heads 12a-12d are configured to eject droplets of marking material onto the image receiving member 3. The platen 11, the carriage 13 and the print heads 12a-12d are controlled by suitable controlling means 18a, 18b and 18c, respectively.

The image receiving member 3 may be a medium in web or in sheet form and may be composed of e.g. paper, cardboard, label stock, coated paper, plastic or textile. Alternatively, the image receiving member 3 may also be an intermediate member, endless or not. Examples of endless members, which may be moved cyclically, are a belt or a drum. The image receiving member 3 is moved in the sub-scanning direction A by the platen 11 along four print heads 12a-12d provided with a fluid marking material.

A scanning print carriage 13 carries the four print heads 12a-12d and may be moved in reciprocation in the main scanning direction B parallel to the platen 11, such as to enable scanning of the image receiving member 3 in the main scanning direction B. Only four print heads 12a-12d are depicted for demonstrating the invention. In practice an arbitrary number of print heads may be employed. In any case, at least one print head 12a-12d per color of marking material is placed on the scanning print carriage 13. For example, for a black-and-white printer, at least one print head 12a-12d, usually containing black marking material is present. Alternatively, a black-and-white printer may comprise a white marking material, which is to be applied on a black image-receiving member 3. For a full-color printer, containing multiple colors, at least one print head 12a-12d for each of the colors, usually black, cyan, magenta and yellow is present. Often, in a full-color printer, black marking material is used more frequently in comparison to differently colored marking material. Therefore, more print heads 12a-12d containing black marking material may be provided on the scanning print carriage 13 compared to print heads 12a-12d containing marking material in any of the other colors. Alternatively, the print head 12a-12d containing black marking material may be larger than any of the print heads 12a-12d, containing a differently colored marking material.

The carriage 13 is guided by guiding means 14, 15. These guiding means 14, 15 may be rods as depicted in FIG. 1B. The rods may be driven by suitable driving means (not shown). Alternatively, the carriage 13 may be guided by other guiding means, such as an arm being able to move the carriage 13. Another alternative is to move the image receiving material 3 in the main scanning direction B.

Each print head 12a-12d comprises an orifice surface 16 having at least one orifice 17, in fluid communication with a pressure chamber containing fluid marking material provided in the print head 12a-12d. On the orifice surface 16, a number of orifices 17 is arranged in a single linear array parallel to the sub-scanning direction A. Eight orifices 17 per print head 12a-12d are depicted in FIG. 1B, however obviously in a practical embodiment several hundreds of orifices 17 may be provided per print head 12a-12d, optionally arranged in multiple arrays. As depicted in FIG. 1B, the respective print heads 12a-12d are placed parallel to each other such that corresponding orifices 17 of the respective print heads 12a-12d are positioned in-line in the main scanning direction B. This means that a line of image dots in the main scanning direction B may be formed by selectively activating up to four orifices 17, each of them being part of a different print head 12a-12d. This parallel positioning of the print heads 12a-12d with corresponding in-line placement of the orifices 17 is advantageous to increase productivity and/or improve print quality. Alternatively multiple print heads 12a-12d may be placed on the print carriage adjacent to each other such that the orifices 17 of the respective print heads 12a-12d are positioned in a staggered configuration instead of in-line. For instance, this may be done to increase the print resolution or to enlarge the effective print area, which may be addressed in a single scan in the main scanning direction. The image dots are formed by ejecting droplets of marking material from the orifices 17.

Upon ejection of the marking material, some marking material may be spilled and stay on the orifice surface 16 of the print head 12a-12d. The ink present on the orifice surface 16, may negatively influence the ejection of droplets and the placement of these droplets on the image receiving member 3. Therefore, it may be advantageous to remove excess of ink from the orifice surface 16. The excess of ink may be removed for example by wiping with a wiper and/or by application of a suitable anti-wetting property of the surface, e.g. provided by a coating.

Figure 2:
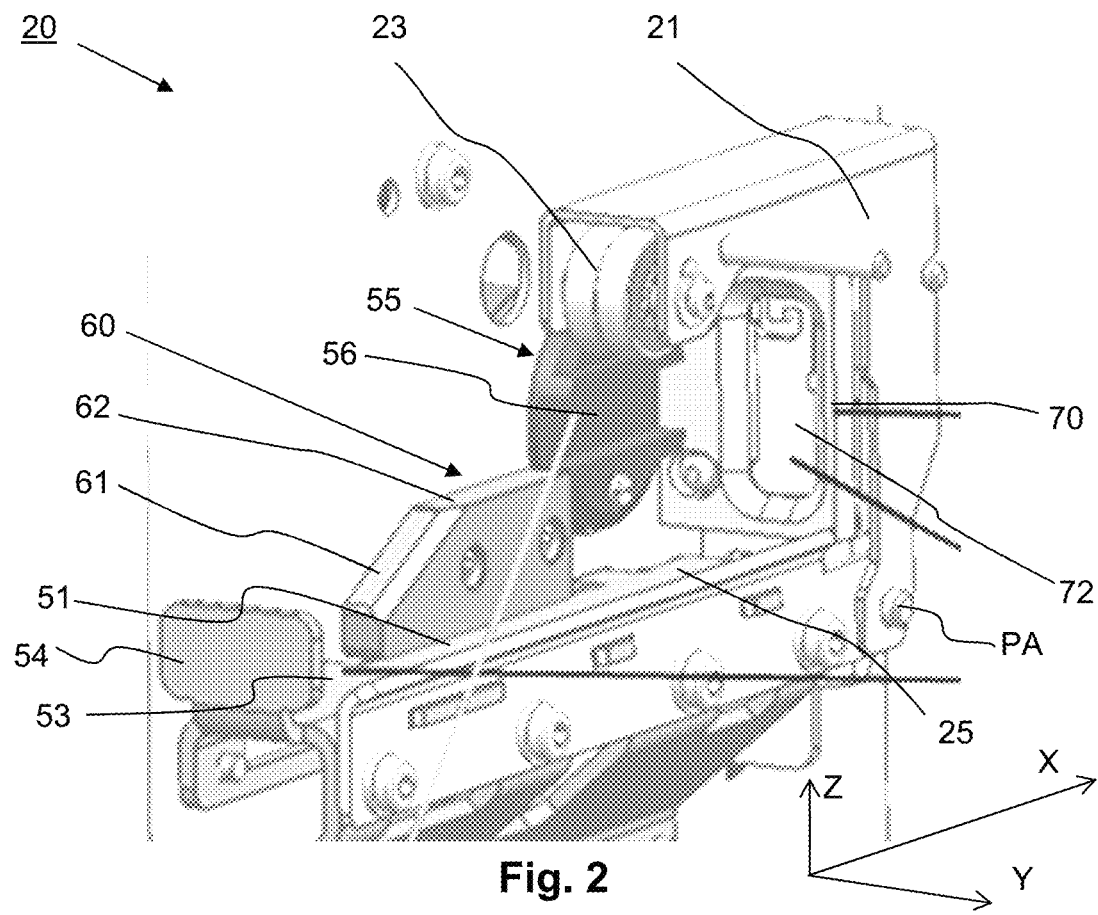
FIG. 2 is a schematic perspective view of a media roll holder assembly according to the present invention.
Figure 3:
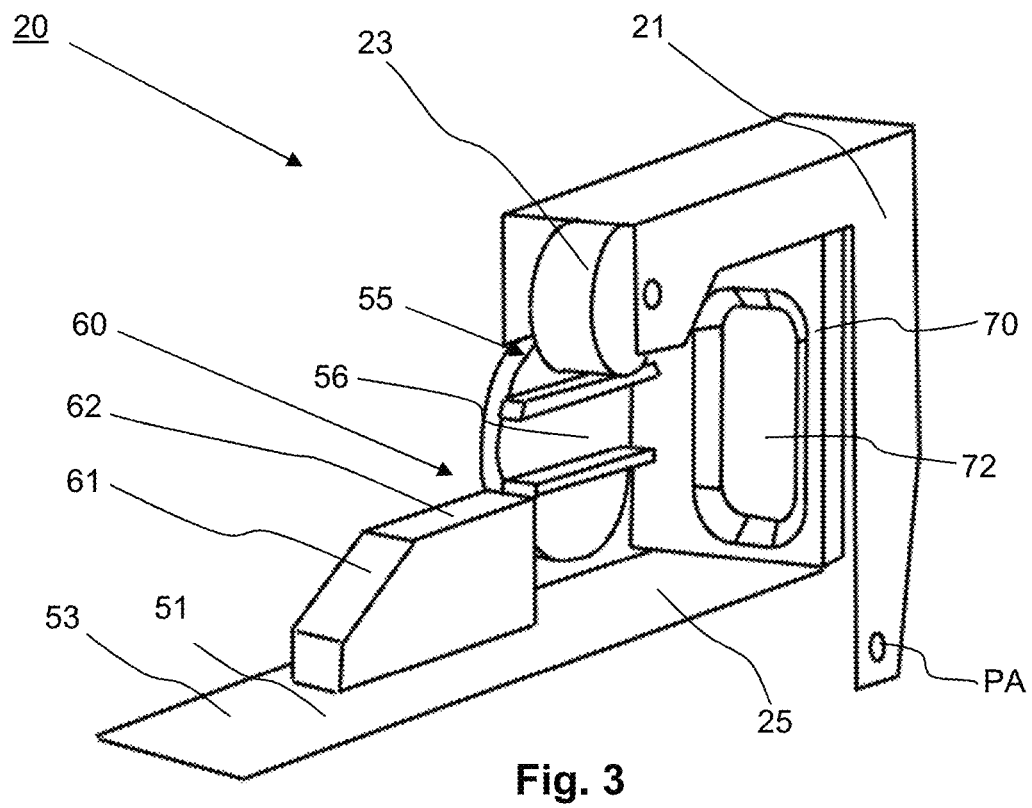
FIG. 3 is a schematic perspective line drawing of the media roll holder assembly in FIG. 2.

FIGS. 2 and 3 illustrate a media roll holder assembly 20 according to the present invention in perspective view. The media roll holder assembly 20 comprises a first guide surface 51 extending in the loading direction X. The first guide surface 51 is in FIG. 2 formed is formed by a longitudinal guide plate 51. The first guide surface 51 comprises a roll receiving section 53 positioned between a stop 54 and a second guide surface 60 for orienting a drive engaging element (83 in FIG. 4). The second guide surface 60 is formed by a guide block. An operator may manually or by means of a suitable loading device load a roller R1 onto the roll receiving section 53. From the roll receiving section 53 the roller R1 may be moved in the loading direction X towards the guide block. A first guide surface portion 61 of the guide block is inclined with respect to the first guide surface 51. Through contact with the second guide surface 60 a drive engaging element of the roller R1 is rotated into a predetermined orientation as the roller R1 moves further in the loading direction X. The predetermined orientation is defined by the second guide surface portion 62 downstream of the first guide surface portion 61. The second guide surface portion 62 aligns the drive engaging element 83 of the roller R1 with a receiving slot 56 of the rotational drive 55. Thereto the rotational drive 55 has been positioned with the receiving slot 56 in a loading orientation substantially aligned with the second guide surface 60. As the drive engaging element 83 is inserted in the receiving slot 56, a portion of the roller R1 contacts the positioning recess 72 formed in the end plate 70. The positioning recess 72 is tapered such that urging the roller R1 in the loading direction X against the positioning recess 72 moves the roller R1 into a predetermined position. The positioning recess 72 is preferably tapered when viewed in both directions Y, Z perpendicular to the loading direction X. The tapering provides alignment for the roller R1 being pushed against the positioning recess 72 in the X and Y directions, whereas the first guide surface 51 determines the height of the roller R1 in the Z direction. When the roller R1 is positioned at the rotational drive 55, the pivotable arm 21 is pivoted around its pivot axis PA to position the holding element 23 on the roller R1 to secure the roller R1. The holding arm 23 is described in more detail in EP 3345849 A1, which description is incorporated herein by reference.

Figure 4:
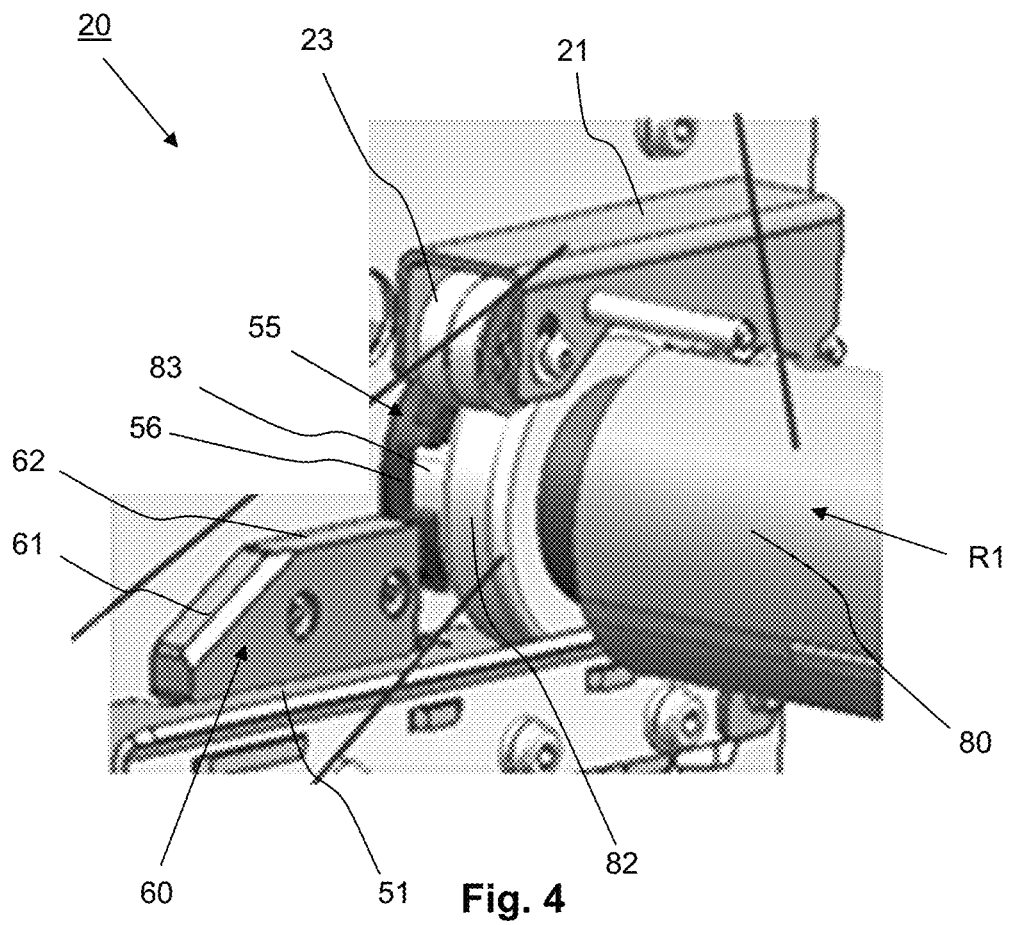
FIG. 4 is a schematic perspective view of the media roll holder assembly in FIG. 2 while holding a roller.

FIG. 4 shows the roller R1 in its loaded position. The roller R1 comprises a central cylindrical core 80 configured for holding a wound-up web material. Preferably, the wound-up web material is provided on a hollow tube. The roller R1 is then insertable in said tube. To prevent the tube from slipping around the cylindrical core 80, friction or holding elements such as rubber stoppers or pins may be provided on the cylindrical core 80. At either axial end, the roller R1 is provided with a support wheel 82 as well as longitudinal drive engaging element 83. The drive engaging element 83 is inserted into the receiving slot 56 of the rotational drive 55. The drive engaging element 83 is dimensioned to fit into the receiving slot 56. When the rotational drive 55 is actuated, the roller R1 is rotated R1 as well via the drive engaging element 83. By rotation of the roller R1 web may be unspooled from the roller R1 towards the print heads 4a-d. To secure the position of the roller R1 against any upwards pulling forces, the pivotable arm 21 curves around the roller R1. The angle between the pivot axis PA and the holding element 23 on the pivotable arm 21 is over 180°. Upwards forces on the holding element 23 are thereby re-directed into a downward urging of the holding element 23, which results in secure and simple holding means. The embodiment in FIG. 4 the holding element is formed by a roller.

Figure 5A:
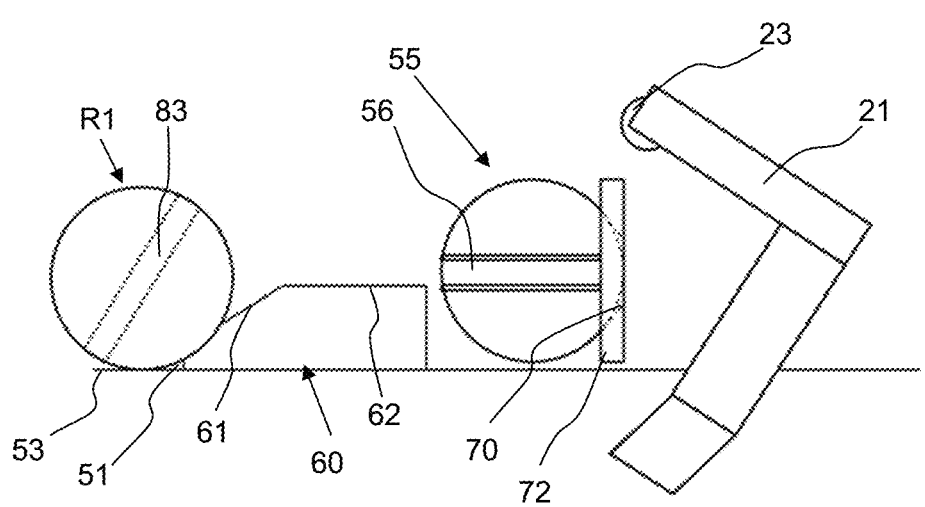
FIGS. 5A-D are schematic side views of the steps of loading a roller in a media roll holder assembly according to the present invention.

FIG. 5A shows in a schematic side view the step of loading a roller R1 onto the roll receiving section 53. The roll receiving section 53 in FIG. 5A is formed by an upstream portion of the first guide surface 51 when viewed in the loading direction X. The orientation or angle of the drive engaging element 83 of the roller R1 with respect to e.g. the horizontal direction after loading onto the roll receiving section 53 is random.

Figure 5B:
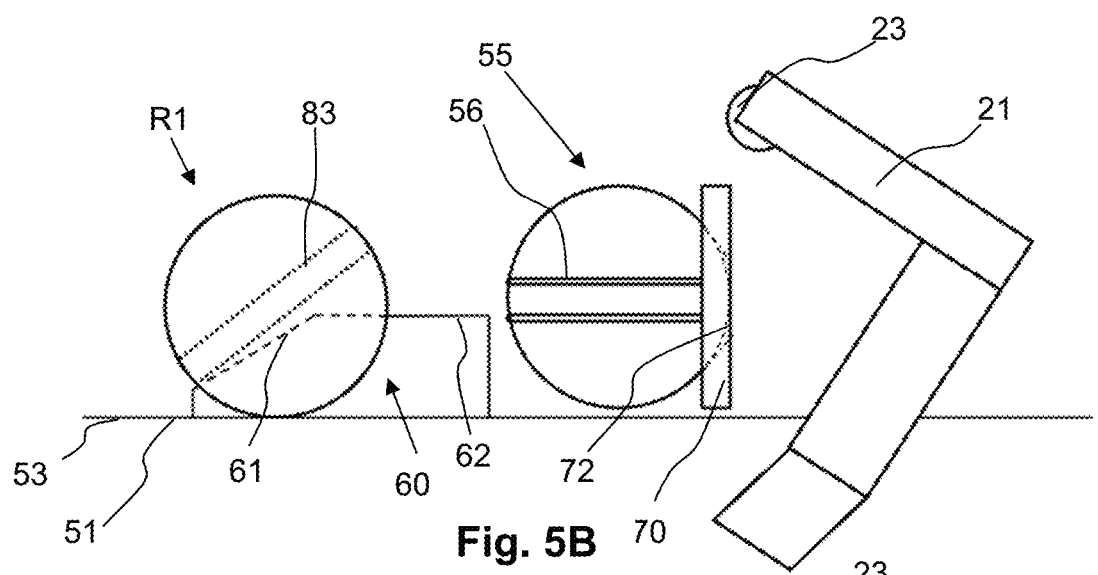

FIG. 5B shows the step of moving the roller R1 in the transport direction X from the roll receiving section 53 to second guide surface 60. The second guide surface 60 is formed by guide block mounted on or along the first guide surface 51 downstream of the roll receiving section 53. The guide block comprises an inclined portion forming the first guide surface portion 61 which transitions into the second guide surface portion 62 where the top surface of the guide block locally extends in the loading direction X. The guide block is positioned such that it does not block movement of the roller R1 in the loading direction X, e.g. on a side of the first guide surface 51 in the Y direction. The guide block is positioned such that the first guide surface portion 61 contacts the drive engaging element 83 as the roller R1 moves along the guide block. Preferably, the drive engaging element 83 is freely rotatable with respect to remainder of the roller R1, such that contact between the inclined first guide surface portion 61 and the drive engaging element 83 rotates the drive engaging element 83 towards the predetermined orientation.

Figure 5C:
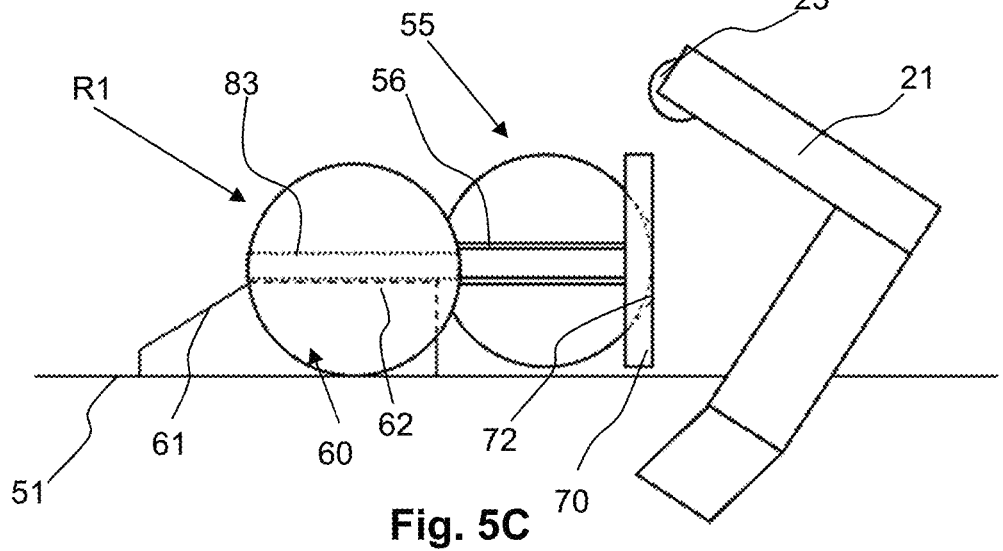

As can be seen in FIG. 5C, the predetermined orientation extends substantially parallel to the loading direction X. In FIG. 5C the predetermined orientation is determined by the direction of the second guide surface portion 62 of the guide block. The second guide surface portion 62 is aligned with the receiving slot 56 of the rotational drive 55, such that further movement in the loading direction X slides the drive engaging element 83 in the receiving slot 56. Thereby, the second guide surface portion 62 and a bottom support surface (i.e. the support surface of the slot 56 nearest the first guide surface 51) extend at substantially the same distance from the first guide surface 51. This distance is preferably the radius of the roller R1 minus half a thickness of the drive engaging element 83. The first guide surface 51 thereby aligns the roller R1 in the appropriate position in the Z direction. The control unit 7 may be configured to orient the roll engaging element 56 of the rotational drive 55 into alignment with the second guide surface portion 62 when a roll loading operation is started or detected.

Figure 5D:
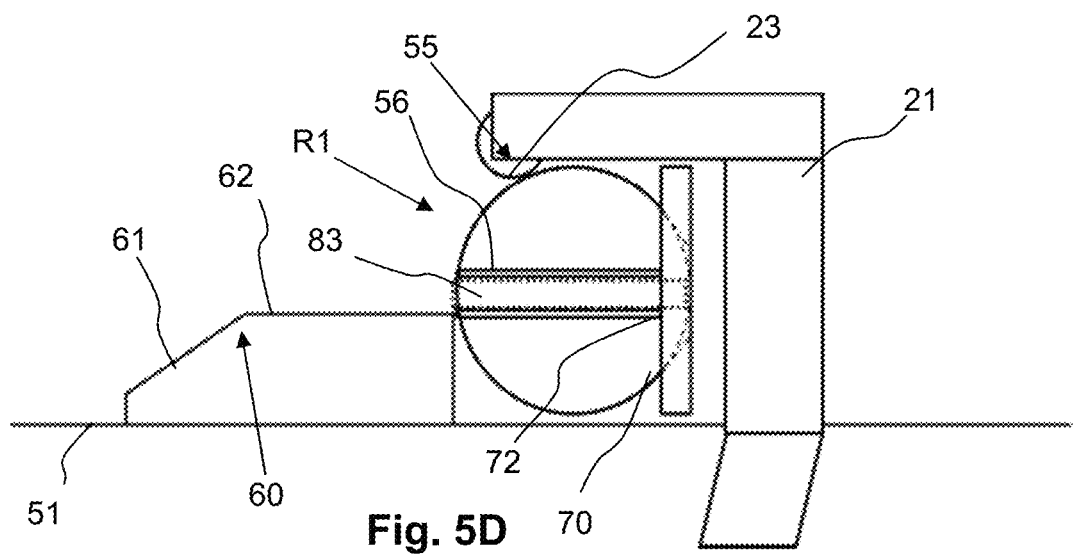

The roller R1 moves along the rotational drive 55 until it encounters the end plate 70, as shown in FIG. 5D. The end plate 70 comprises the positioning recess 72 dimensioned and positioned to receive the support wheel 82 of the roller R1. The positioning recess is tapered in the loading direction X. In said X direction, the positioning recess 72 is narrowing in both the Y and Z direction. The inner edges or surfaces of the positioning recess 72 are at an angle with the loading direction X. Thereby, the support wheel 82 by pushing it against the tapered positioning recess 72 is urged to a predefined position in both the X and Y directions. The positioning recess 72 in combination with the first guide surface 51 positions the roller R1 in the correct operational position in the X, Y, and Z directions. The operator merely needs to push the roller R1 forward in the loading direction X to properly align the roller R1. As such, easy roll loading is achieved.

FIG. 5D further illustrates the step of pivoting the pivotable arm 21 to position the holding element 23 onto the roller R1. This achieves a reliable yet mechanically simple means of securing the roller R1 against forces pulling on the roller R1 via the web being unwound from said roller R1. Details of the arm are described in more detail with respect to the embodiment in FIG. 6.

Figure 6:
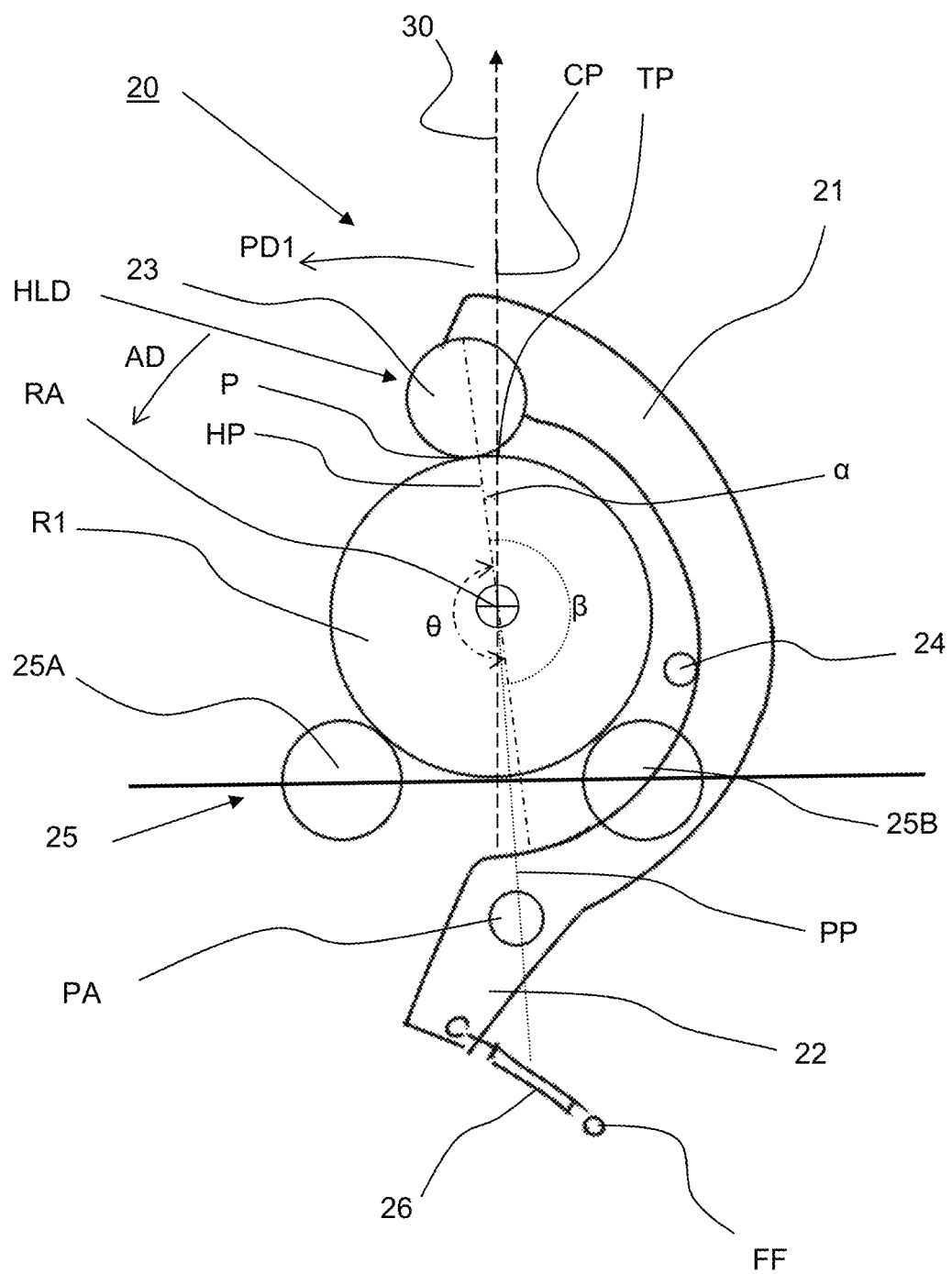
FIG. 6 is a schematic side view of another embodiment of the media roll holder assembly according to the present invention.

FIG. 6 illustrates another embodiment of a media roll holder assembly 20 according to the present invention. The media roll holder assembly 20 rotatably secures the roller R1 during printing, such that the roller R1 retains its operative position on the support 25. The roller R1 is preferably a roll support R1 around which print media is wound or a roll support core R1 arranged for being provided into and supporting a cylinder core around which the medium is wound. During printing the web media is unspooled from the roller R1 along the transport path into the printing system 1 for printing on said media. The roller R1 during printing is held in its operative position due to a holding element 23 mounted on a pivotable arm 21. The pivotable arm 21 curves around the roller R1 in such a manner that a lifting force in the direction of the transport path results in a reaction holding force urging the holding element 23 in a first angular direction AD. The pivoting arm 21 is then driven in the first pivoting direction PD1. As in this direction PD1, the holding element 23 is driven closer to the rotation axis of the roller R1, the holding element 23 is forced onto the roller R1. As such, the holding element 23 rotatably secures the roller R1 while printing. A well defined position of the roller R1 during printing allows for accurate stepping or moving of the media, thereby increasing the print quality.

In FIG. 6, the holding element 23 of the media roll holder assembly 20 is in its holding position HLD on the periphery of the roller R1 in its operative position during printing. There the holding element 23 contacts the roller R1 at the contact point P. The pivotable arm 21 is arranged to pivot the holding element 23 between the holding position HLD in FIG. 6 and an open position which will be discussed further on with respect to FIG. 3. The support 25 in FIG. 6 comprises a pair of support wheels or rollers 25A, 25B, which are positioned to allow the roller R1 to rotate around its rotation axis RA. The support wheels 25A, 25B are preferably rotatable. Their positions may be adjustable in correspondence to a diameter of the roll support R1, though generally a single roll support diameter is applied. The media roll holder assembly 20 is positioned laterally to the side of the web media on the roller R1, such that it engages the roller R1 in regions not covered by print media. In the embodiment shown in FIG. 6 one or more support wheels 25A, 25B are provided to further support the roller R1. The support wheel 25A, 25B are optional and may be omitted and/or replaced by the first guide surface 51 as in the embodiment in FIG. 2. The rotation of the roller R1 is actuated via the drive engaging element 83 engaged in the receiving slot 56 of the rotational drive 55, as shown in FIGS. 2 and 3.

FIG. 6 schematically illustrates the central plane CP extending in the feeding direction 30 parallel to the transport path. The central plane CP further extends to the rotation axis RA. In the example shown in FIG. 6, the feeding direction 30 is directed vertically upwards. The holding element 23 is positioned angularly offset or spaced apart from the central plane CP, specifically at the first angle $\alpha$. The first angle $\alpha$ in FIG. 6 is indicated an angle between the central plane CP and a holding plane HP extending through the rotation axis RA and the contact point P. It will be appreciated that the first angle $\alpha$ is a non-zero angle, preferably relatively small, e,g, less than 30°, specifically less than 10°. On one side of the holding plane HP, the pivot axis angular $\theta$ is indicated. The pivot axis is positioned substantially on the second side (right side in FIG. 6) of the central CP. This due to the fact that the pivoting arm 21 extends from the pivot axis PA in the first angular direction AD to the holding element 23 in the holding position HLD. The pivoting arm 21 extends then over the second angle $\beta$, which is in FIG. 6 is over 180° to position the pivot axis PA inside the pivot axis angular $\theta$. In the preferred embodiment in FIG. 6, the second angle $\beta$ angularly positions the pivot axis between the central plane CP and the holding plane HP. In FIG. 6, a pivoting plane PP extending through the rotation axis RA and the pivot axis PA is indicated to illustrate the intermediate position of the pivot axis PA between the central plane CP and the holding plane HP.

FIG. 6 further illustrates the holding element 23 which in FIG. 6 is formed by a holding wheel or roller 23. The holding element 23 is provided rotatable or moveable on the pivotable arm 21 to allow for frictionless movement of the holding element 23 over the roll support R1. The pivotable arm 21 is arranged to pivot around its pivot axis PA, which is positioned below the roller R1. The pivot axis PA as well as the support 25 (or the first guide surface 51) is positioned on the bottom side of the roll support R1. The up direction herein is defined as the feeding direction 30 of the transport path from the media roll holder assembly 20 to the printing system 1. The pivotable arm 21 extends from the pivot axis PA on the bottom side of the roller R1 around the roller R1 over the highest or top point TP of the roller R1 to the contact point P where the holding element 23 engages the roller R1. The pivotable arm 21 in FIG. 6 is curved as a C-shape, which extends over more than a semicircle around the rotation axis RA. The pivotable arm 21 curves around the rotation axis RA over the second angle β, which has a value of more than 180° and less than 270°. In FIG. 6, the second angle β angularly positions the holding element at a little over 180° from the pivot axis PA. The position of the pivot axis PA and/or the pivotable arm 21 is shaped, such that the pivotable arm 21 is arranged to pivot in a first pivoting direction PD1 to decrease the distance between the holding element 23 and the roller R1, specifically its periphery or rotation axis RA. Pivoting the pivoting arm 21 in the first pivoting direction PD1 urges the holding element 21 onto the roller R1, thereby pressing or clamping the roller R1 downwards in Z direction.

A stop element 24 is provided to restrict the pivoting movement of the pivotable 21 in the first pivoting direction PD1. Thereby, the stop element 24 defines the angular position of the holding element 23 on the roll support R1. The stop element 24 ensures that the holding element 23 secures the roll support R1 in its operative position without exerting excess force. In this manner additional friction on the roller R1 is prevented, allowing for an accurately controlled stepping motion of the roller R1.

To facilitate easy loading of the roll support R1 into the media roll holder assembly 20, an urging element 26 is provided. The urging element 26, which may be spring 26, is connected at one end to the fixed frame FF of the printing system 1 and at the other end to an urging arm 22 connected to the pivotable arm 21. The pivotable arm 21 and the urging arm 22 are preferably integrally formed, but are positioned at opposite sides with respect to the pivot axis PA. The spring or piston 26 ensures the holding element 23 remains in the holding position HLD in absence of a lifting force. When loading a new roll support R1, the urging element automatically drives the pivotable arm 21 in the first pivoting direction PD1 to position the holding element 23 in its holding position HLD, as shown in FIG. 6. As such, the loading of a new roll support R1 may be performed in a single motion by an operator or loading device, thereby improving the overall workflow and productivity of the printing system 1. It will be appreciated that the urging force may be relatively small, as any lifting force on the roller R1 automatically results in an additional reactive holding force. The stop element 24 prevents the holding element 23 from being pressed to hard onto the roller R1. This reduces the angular friction on the roller R1 resulting in more accurate control of the rotation of the roller R1, and in consequence a higher print quality.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, such a reference to a structural element encompasses a computer readable medium carrying such computer executable instructions.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A media roll holder assembly for a roll that is detachably supported in a printing system, the media roll holder assembly comprising:
    a rotational drive comprising a roll engaging element configured for fittingly engaging and driving a drive engaging element of a roller;
    a first guide surface configured to support and direct the roller in a loading direction; and
    a second guide surface at least partially extending at an angle with respect to the first guide surface, such that movement of the roller over the first guide surface brings the drive engaging element in contact with the second guide surface,
    wherein the second guide surface directs the drive engaging element into a predetermined orientation, said predetermined orientation aligning the drive engaging element with the roll engaging element in a loading orientation, such that further movement of the roller in the loading direction inserts the drive engaging element into the roll engaging element.

2. The media roll holder assembly according to claim 1, wherein one of the roll engaging element and the drive engaging element is a receiving slot.

3. The media roll holder assembly according to claim 2, wherein the other one of the roll engaging element and the drive engaging element is a longitudinal beam element dimensioned to fit in the receiving slot.

4. The media roll holder assembly according to claim 1, wherein the second guide surface is configured to direct the drive engaging element parallel to the loading direction.

5. The media roll holder assembly according to claim 4, wherein the second guide surface is partially inclined to direct the drive engaging element parallel to the loading direction.

6. The media roll holder assembly according to claim 4, wherein a second guide surface portion is inclined with respect to a first guide surface portion to direct the drive engaging element parallel to the loading direction.

7. The media roll holder assembly according to claim 1, wherein the first guide surface extends parallel to the loading direction.

8. The media roll holder assembly according to claim 1, wherein the second guide surface comprises a first guide surface portion upstream of a second guide surface portion, wherein the first guide surface portion extends at a non-zero angle with respect to the first guide surface and wherein the second guide surface portion extends parallel to the first guide surface.

9. The media roll holder assembly according to claim 1, further comprising a support positioned downstream of the second guide surface in the loading direction to support the roll in an operative position, such that the roll is arranged to rotate around a rotation axis, wherein the support is provided with a tapered positioning recess configured to receive at least part of the roller, such that the roller is aligned into a predetermined position by urging the roller against the tapered positioning recess.

10. The media roll holder assembly according to claim 9, wherein the tapered positioning recess is tapered in the loading direction.

11. The media roll holder assembly according to claim 1, further comprising:
  a holding element positionable in a holding position at a periphery of the roll to engage the roller at a contact point for holding the roller rotatably around a rotation axis thereof; and
  a pivotable arm on which the holding element is provided, the pivotable arm being configured to pivot around a pivot axis,
  wherein the holding element in the holding position is positioned at an angle of at least 180° from the pivot axis as measured around the rotation axis in a first pivoting direction wherein the holding element moves towards the rotation axis.

12. The media roll holder assembly according to claim 11, wherein the pivotable arm is configured, such that a lifting force on the roll results in a holding force on the holding element in the holding position in a first angular direction, said holding force urging the pivotable arm in the first pivoting direction, thereby urging the holding element against the roller for clamping the roller.

13. The media roll holder assembly according to claim 11, wherein the pivotable arm is configured to pivot around the pivot axis, such that a distance between the holding element and the rotation axis of the roller is decreased in the first pivoting direction.

14. The media roll holder assembly according to claim 1, wherein the second guide surface is formed by a guide block positioned besides the first guide surface, such that movement of the roller over the first guide surface in the loading direction is not obstructed by the guide block.

15. A roll printing system comprising the media roll holder assembly according to claim 1.

16. A method for loading a roller for wound up print media into the media roll holder assembly according to claim 1, the method comprising the steps of:
  moving the roller onto a first guide surface in a loading direction, such that the roller first moves along the second guide surface at least partially extending at an angle with respect to the first guide surface, wherein movement of the roller over the first guide surface brings a drive engaging element of the roller in contact with the second guide surface, such that the second guide surface directs the drive engaging element into a predetermined orientation; and
  moving the roller further over the first guide surface, such that the drive engaging element in the predetermined orientation is transferred from the second guide surface to a roll engaging element of a rotational drive.

17. The method according to claim 16, further comprising the step of:
  moving the roller further in the loading direction, such that the roller is urged against a tapered positioning recess of a support, thereby aligning the roller in a predetermined operational position.

* * * * *